Oct. 14, 1947.  M. WATTER  2,429,144
METHOD OF ASSEMBLING AIRCRAFT STRUCTURES
Original Filed March 26, 1941  4 Sheets-Sheet 2
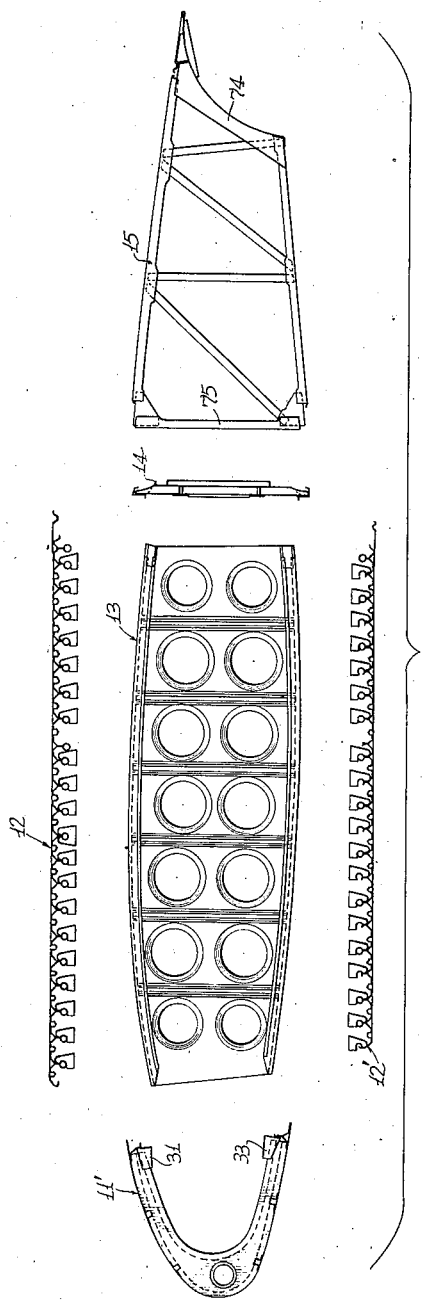
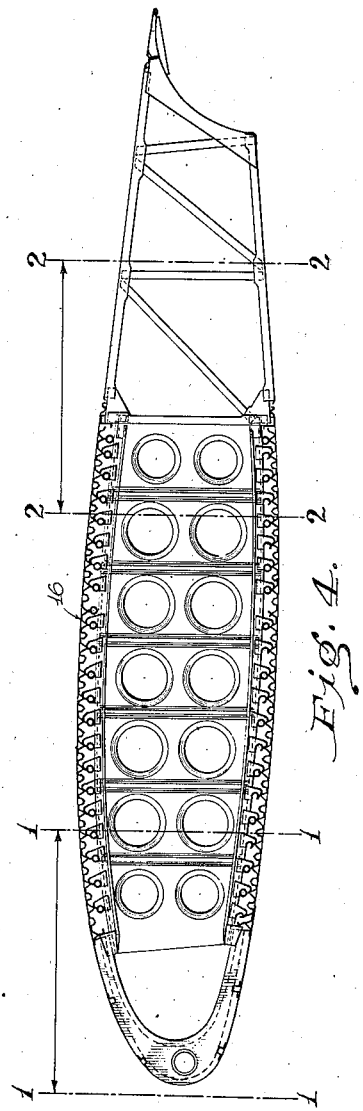
INVENTOR
Michael Watter
BY John P Tarbox
ATTORNEY Oct. 14, 1947.   M. WATTER   2,429,144
METHOD OF ASSEMBLING AIRCRAFT STRUCTURES
Original Filed March 26, 1941   4 Sheets-Sheet 3
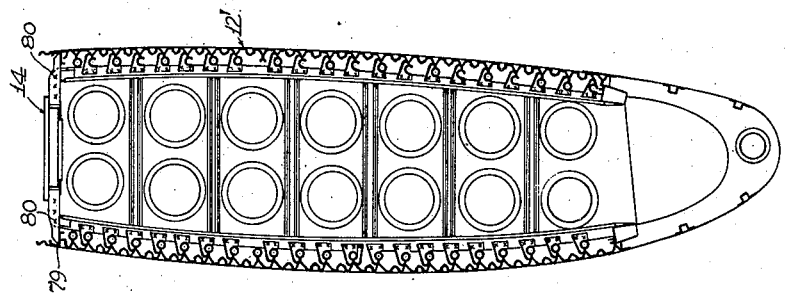
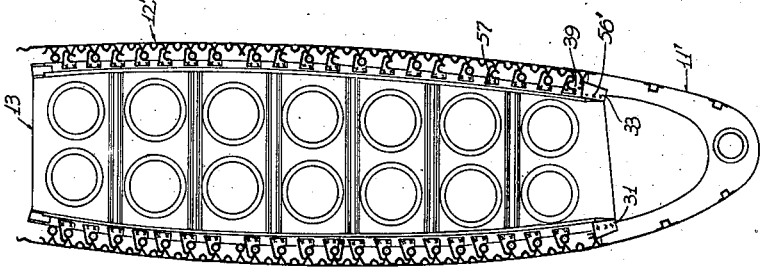
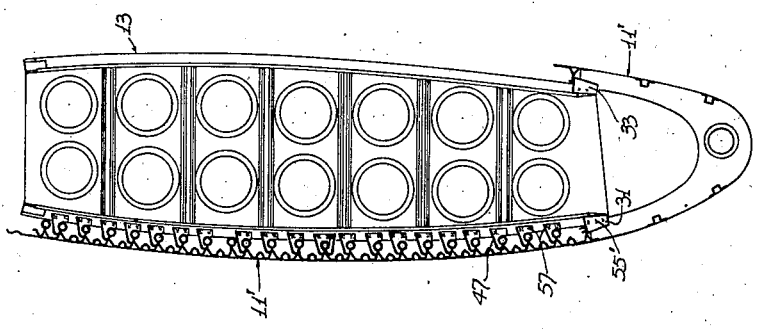
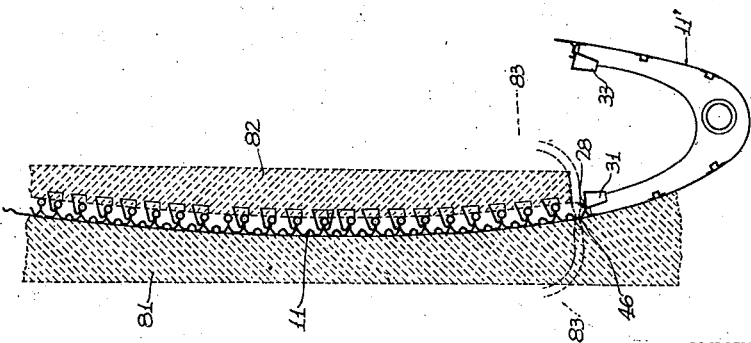
INVENTOR
Michael Watter
BY John P Tarbox
ATTORNEY Oct. 14, 1947.                    M. WATTER                    2,429,144
                 METHOD OF ASSEMBLING AIRCRAFT STRUCTURES
                     Original Filed March 26, 1941.   4 Sheets-Sheet 4

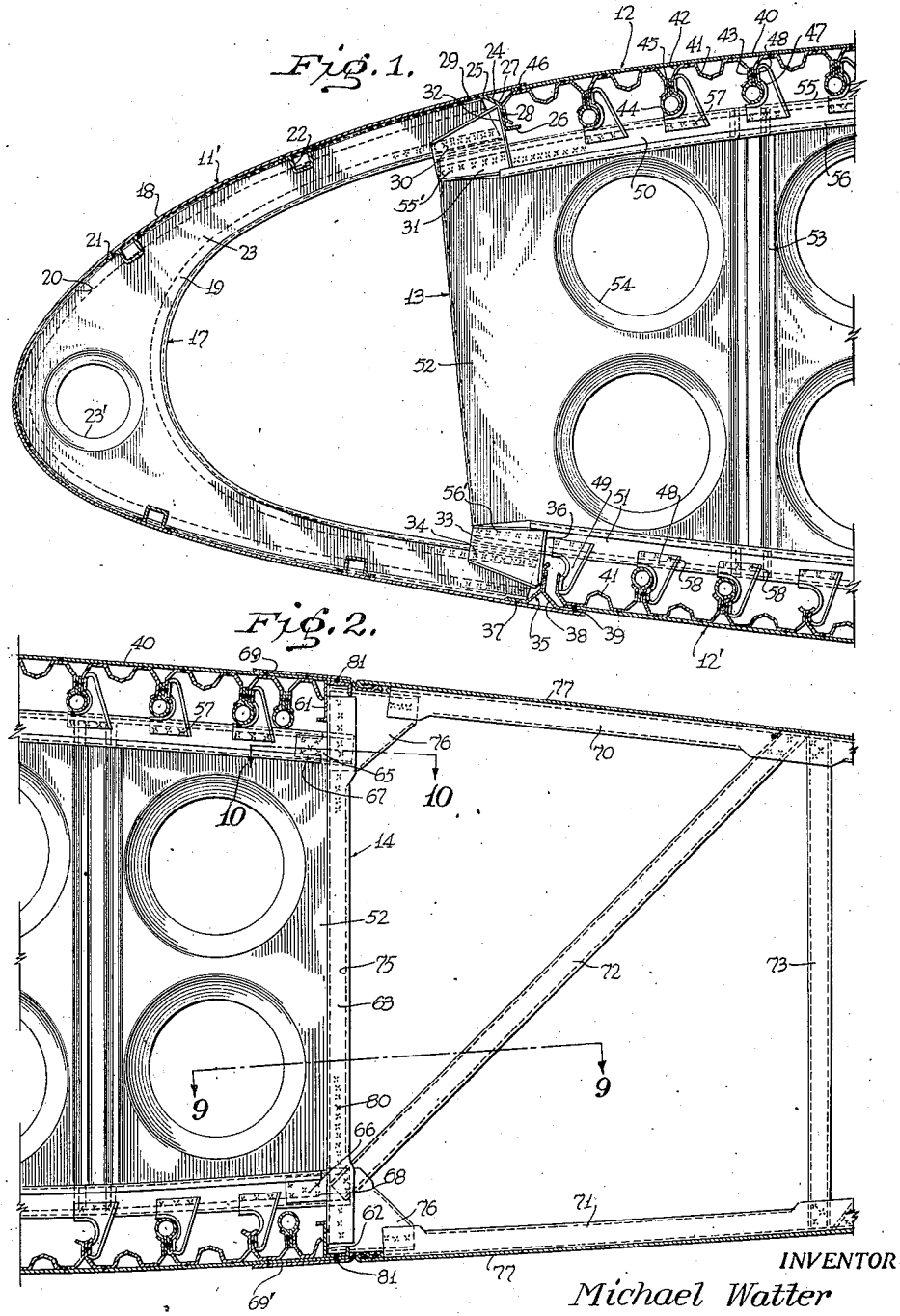

INVENTOR
Michael Watter
BY John P Tarbox
ATTORNEY

Patented Oct. 14, 1947

2,429,144

UNITED STATES PATENT OFFICE 2,429,144

METHOD OF ASSEMBLING AIRCRAFT STRUCTURES

Michael Watter, Philadelphia, Pa., assignor to The Budd Company, Philadelphia, Pa., a corporation of Pennsylvania Original application March 26, 1941, Serial No. 385,235. Divided and this application September 14, 1942, Serial No. 458,249

5 Claims. (Cl. 29—148.2)

This invention relates to methods of constructing or assembling airfoil structures for airplanes, and is divided from a pending application Serial No. 385,235, filed March 26, 1941, now Patent No. 2,396,625, and relating to aircraft structures.

Heretofore, it has been the practice to assemble airfoil structures by starting with the usual spar structure and building the remaining frame parts on to the same, and finally adding to the frame assembly the skin structure. Such a method of assembling airfoil structures does not lend itself particularly well to airfoil structures which are made up by welding and inasmuch as the number of welds required is great and in that the majority of these welds would have to take place among the frame parts and in locations substantially inaccessible to a welding tool.

It is, therefore, the object of the present invention to provide a method of assembling or constructing an airfoil structure wherein minimum welding operations for effecting the final assembly of the airfoil structure may be had, and had with the least possible interference for the welding tool.

It is also the object of the present invention to provide a method of assembly wherein the majority of the welding operations may take place at the time of making up the subassemblies, and one where the more delicate welding operations may be done on these sub-assemblies and free of interfering frame structure.

According to the present invention, the leading edge, skin blankets, ribs, spar and trailing edge structures are preformed and provided with attaching portions for connection with one another. The leading edge, one of the skin blankets, and the ribs are the first assembled together, then the other skin blanket is connected to the ribs, access being provided through the space adjacent to the ribs, and between the rearward edges of the skin blanket. By omitting the spar in this main part of the assembly, access is readily had for the welding of the skin blanket to the ribs. Finally, the spar and the trailing edge structure is welded to the ribs already located in their proper position in the thus far assembled structure. The welding operations for connecting these sub-assemblies together are few and relatively easy to make.

For a better understanding of the invention, reference may be had to the following detailed description taken in connection with the accompanying drawing in which, Figure 1 is an enlarged sectional view of the forward part of the airfoil structure, including the leading edge thereof and taken of the portion 1—1 of Figure 4;

Figure 2 is an enlarged sectional view of the airfoil structure at the union of the trailing edge and spar structures with the rib and rearward edges of the skin blankets and taken of the portion 2—2 of Figure 4;

Figure 3 is an exploded view of the airfoil structure showing the sub-assemblies thereof;

Figure 4 is a view in section of the airfoil with all the sub-assemblies finally connected together;

Figures 5, 6, 7 and 8 are views illustrating the steps in the method of assembly of the parts of the airfoil structure and just prior to the adding of the trailing edge structure;

Figure 9:
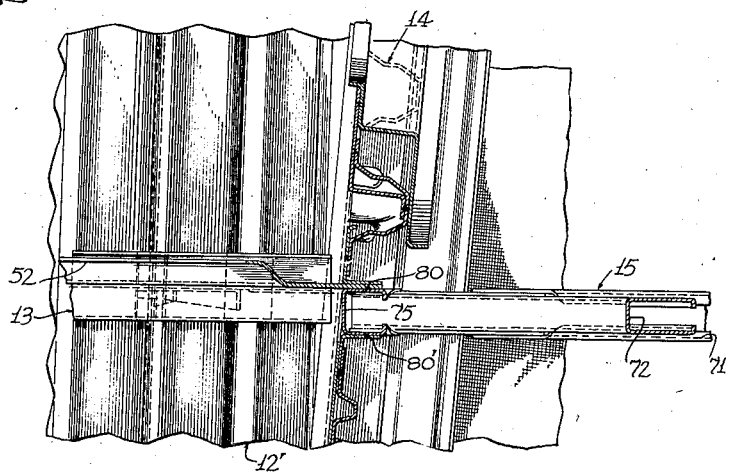
Figure 9 is an enlarged fragmentary view, in section, and taken along the line 9—9 of Figure 2, looking in the direction of the arrows thereof and showing the union of the web portion of the rib, the spar, and the trailing edge.

Referring now to Figs. 3 and 4, there are shown the various sub-assemblies of the airfoil structure to which the present method of assembling is applied. These structures include a leading edge 11', top and bottom skin blankets 12 and 12', a rib structure 13, a spar structure 14 and a final trailing edge structure 15. These sub-assemblies, when connected together, make up a final airfoil structure 16, shown in Fig. 4. All of these sub-assemblies are preformed in the various jigs made special for their peculiar shapes, and all of the same are provided with certain portions to which attachment is made of other of the sub-assemblies. On referring now to Figs. 1 and 2, showing an enlarged view of these structures and with the following description, these attaching portions will become more apparent.

As shown in Fig. 1, the leading edge structure 11' includes a nose piece 17 over which a skin 18 is stretched. This nose piece 17 includes inner and outer angle members 19 and 20. The outer angle member 20 has a laterally extending flange portion 21 to which the skin blanket 18 is welded. It will be understood that for a single leading edge structure there will be provided throughout the length of the same a series of nose pieces 17 over which the entire skin of the leading edge section is stretched. Disposed between the nose pieces and extending transversely without being connected to the nose pieces, are transversely extending intercostal members 22 of hat shape. These members serve to stiffen the skin 18 between the nose pieces, and do thereby prevent wrinkling of the same. Between the angle members 19 and 20 of the nose pieces 17 is a web 23 having an opening 23' therein through which controls, incidental to the operation of the aircraft, may pass.

The skin 18 of the top of the nose pieces 17 extends beyond the rearward end thereof for overlapping connection with the skin blanket assembly 12. In order to provide on the leading edge at this location an attaching portion to which the skin blanket 12 may be attached, there is extended spanwise of the same a metal piece 24 of Z-shape cross-section and having spaced flanges 25 and 26, and an intermediate web 27 to the latter of which the actual weld for the securing of the skin blanket is made, as indicated at 28. The skin 18 and the flange 25 are weldingly secured to the flange 21 of the outer angle member 20 of the nose piece 17, in the manner as indicated at 29.

In order to steady the spanwise extending attaching piece 24 of the leading edge at a location removed from its connection with the skin 18 and at the same time to provide means to which the rib structure 13 may be readily attached, there is weldingly secured, as indicated at 30, an attaching piece 31 having a laterally extending flange 32 which is connected flush to the piece 24 by the same union 28 that the skin blanket is attached to the piece 24. As seen at the bottom of Fig. 1, there is another attaching piece, similar to the piece 31, connected with the leading edge section. This other one is indicated at 33 and is welded at 34 to the nose piece 17.

On the lower end of the leading edge structure, is a spanwise extending attaching portion 35 connected to a flange 36 of the attaching piece 33 and also to the skin 18 and flange 21 of the outer angle member 20 as indicated at 37. Provided at this location, is a spanwise extending reinforcing element 38 welded to the piece 35 and in turn secured along with the rearward edge of the skin 18 to the lower skin blanket 12', the union being indicated at 39.

The upper skin blanket 12 includes a skin 40 extended over and secured to a plurality of channel-shaped reinforcing elements 41 having inwardly extending portions 42 and 43 adapted for connection with similar vertical portions of other channel elements 41. In making this connection of the portions 42 and 43 of respective channel pieces 41, there is disposed between the inwardly extending portions a tubular stringer 44 having flattened radially extending connecting portions 45 adapted to be disposed between the inwardly extending portions of the channels and weldingly secured thereto making combined union of the inwardly extending portions 42 and 43 and the stringer 44. The channel element 41 on the forward edge of the skin blanket assembly 12 overlaps the skin 40 and its portion 42 is adapted for attachment to the spanwise attaching piece 22 of the leading edge assembly 11'. In its final location the top skin blanket 12 will have its skin 40 overlap with the skin 18 of the leading edge 11', and a welded union as indicated at 46 is finally made.

Adapted to partially surround the stringer 44 and connected to the union of the stringer with the vertical portions 42 and 43 of the channel elements, are attaching clips 47 which serve for the connection of the blanket assembly to the rib 13. These attaching clips are connected to the skin blanket and form a part of the skin blanket sub-assembly. They have an attaching portion 48 by which they are welded to the channel elements 41. The lower skin blanket assembly 12' is constructed similarly to the upper skin blanket 12 and a further detail description of it is believed to be unnecessary. The union of the lower skin blanket 12 to the leading edge structure 11' is made as indicated by the weld at 39. An additional attaching clip 49, however, is provided in this lower blanket assembly. It is carried by a vertically extending portion 43 of the forward channel element 41. The attaching clips 48 also form a part of the lower skin blanket assembly.

Coming now to the rib structure 13, it will be seen from Figs. 1 and 2 that there are provided generally upper and lower cap strips 50 and 51 retained in spaced relation by a web plate 52 corrugated as indicated at 53 and having cut-out openings 54. These cap strips 50 and 51, respectively, have stiffening flanges 55 and 56 extending in opposite directions and the section through the cap strip generally taking the form of a Z. The forward ends of the cap strips 50 and 51 are formed to receive respectively the attaching pieces 31 and 33 of the leading edge 11', so that when the ribs are assembled to the leading edge 11', so that when the ribs are assembled to the leading edge structure there can be made readily therewith the welds 55' and 56' respectively. At the same time, the welds 57 and 58 are made of the attaching clips 47 and 48 respectively of the skin blanket assemblies 12 and 12'. These welds 57 and 58 are made readily to the cap strips 50 and 51 respectively by disposing the welding tongs respectively in the spaces at opposite sides of the rib.

The spar structure 14 is a complete assembly and has therein openings 60 spaced across the same, corresponding to the spacing of the ribs which are adapted for attachment with the spar structure or assembly 14. This spar assembly includes Z-shaped cap strips 61 and 62 to which is welded a corrugated web portion 63, having flanges 64 and 64' forming the side wall of an opening 60. The cap strips 50 and 51 of the ribs 13 at their trailing ends are relieved of portions of their flanges 55 and 56 and in exchange for this loss of metal, are provided with reinforcing pieces 65 and 66, respectively. These pieces are welded respectively as indicated at 67 and 68 to the cap strips. When the spar 14 is in its final position the rearward ends of the cap strips 50 and 51 having the reinforcing elements 65 and 66, respectively, enter the opening 60 along with the web 52 and into face-to-face alignment with the side wall 64—see Fig. 10. The rearward edges of the skin 40 forming a part of the skin blanket assemblies 11 and 11' overlap the cap strips 61 and 62 of the spar structure 14 and extended over these rearward edges of the skin 40 to reinforce the same are reinforcing skin plates 69 and 69'.

Figure 10:
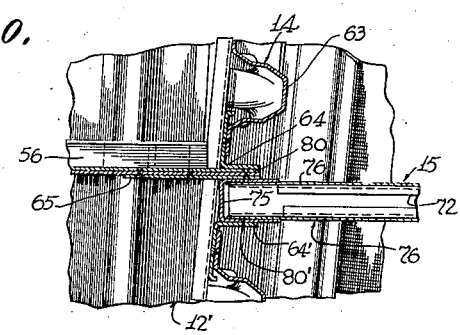
Figure 10 is a similar view but taken along the line 10—10 of Figure 2 and looking in the direction of the arrows thereof and showing the union of the web cap strip, the spar, and the trailing edge.
Figure 11:
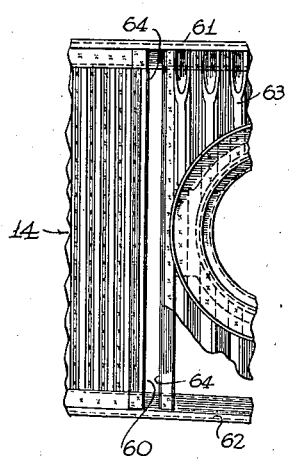
Figure 11 is a fragmentary view in elevation and looking at the rearward face of the spar.

The trailing edge structure 15 includes the cap strips 70 and 71 and truss elements 72 and 73. The rearward ends of its cap strips 70 and 71 are held in spaced relation by a plate 74, see Fig. 3. The forward end of the trailing edge has a strut member 75 as shown in Figs. 9 and 10, which is of such dimension as to fit within the opening 60 of the spar structure. The connections of the strut member 75 with the forward ends of the cap strips 70 and 71 of the trailing edge structure is made by means of gusset plates 76 also adapted to fit within the opening 60 of the spar structure. The trailing edge structure consists of a frame over which is spread in the final assembly of the entire airfoil structure a skin 77, either of metal or of fabric, the connection of the same with the trailing edge frame being made in the usual manner and adapted to overlap the reinforcing strips 69 and 69' on the rearward edges of the skin blankets 12 and 12'.

With the trailing edge fitted with its strut member 75 in the opening 60 and with the spar structure in its proper location over the rearward ends of the ribs so that they are projected into the openings 60, a simple welding operation can be made, and the airfoil be given its final form. This welding union takes place along the side wall faces 64 and 64', as indicated at 80 and 80'. It should be particularly apparent now that the spar structure and trailing edge are the last assemblies to be attached and that this is done after the ribs have been definitely located between the skin blankets and connected to the leading edge structure.

Referring now particularly to Figs. 5, 6, 7 and 8, the steps in the general assembly, up to the connecting of the spar structure, will be more clearly brought out and the advantages of this method of assembly of facilitating the welding operations will become more apparent. As shown in Fig. 5, the top skin blanket 12 is first attached to the leading edge structure 11'. While this attachment is being made, the skin blanket is retained by clamping elements 81 and 82. Welding tool tongs 83 operate on opposite sides of the blanket and the union at 46 is made. Since the lower skin blanket 12' and the ribs 13 have not been assembled up to this time, the unions 28 of the flange 32 of the leading edge and of the spanwise extending attaching portion 24 may be readily made with the inwardly extending portion 42 of the channel piece 41 to complete the union of the skin blanket 12 with the leading edge 11'.

The next step in the method is as shown in Fig. 6, to add the rib assemblies 13. Since the lower skin blank 12' has not been added up to this time, ready access is had for the welding tongs by straddling the individual rib for attachment of the clips 47 to the cap strip 50 and the attachment of the rib with the leading edge attaching piece 31. With the ribs finally secured to the top skin blanket 12, the lower skin blanket 12' is then added to form the assemblage shown in Fig. 7. The welding tongs for the welding of the lower skin blanket with the leading edge structure 11' to provide the welded union 39 can be made by the welding tongs straddling the lower blanket with one of the tongs inside of the space defined by the skin blankets. With the welding tongs removed and both arranged to enter the spaces between the rearward edges of the skin blankets and on opposite sides of the ribs the welded union 56 of the cap strip 51 with the attaching piece 33 of the leading edge structure and the welded unions 58 of the attaching clips 48 to the cap strip 50 is now readily made. It will be apparent that up to this time the spar structure serving to close the assembly has not been added, whereby the method has afforded simple welding operations in the making up of the bulk of the airfoil.

Coming now to the step in the method of adding the spar structure as shown in Fig. 8 and the closing of the assembly, it will be seen that as explained above, the spar structure is put in place so that its openings 60 register with the projection of the ribs 13. At this time the trailing structure can be added and a final welding operation for the securing of the spar structure and the trailing edge structure to the rib now takes place. This is done after the welding of the cap strips 61 and 62 of the spar structure 14 is made with the rearward edges of the skin blanket 40 of the skin blanket assemblies 12 and 12' and of the reinforcing strips 65 thereto, as indicated at 81.

It should now be apparent from the method of assembling an airfoil structure just defined that there has been provided a method which may be easily carried out and wherein the welding operations can be performed with minimum of interference for the welding tools.

While various changes may be suggested as to the detailed steps in the method of time forming the airfoil, it shall be understood that these steps are meant to be included by the present invention as defined by the appended claims.

What is claimed is:

1. The method of manufacturing an airfoil structure which consists in prefabricating as unitary sub-assembly structures a leading edge structure, top and bottom skin blankets, rib structures, and a spar structure and then, in consecutive order, finally securing the leading edge of one of said blankets to an edge of said leading edge structure, disposing said rib structures in position and finally securing them to said leading edge structure and to said one blanket, finally securing the other blanket to the other edge of said leading edge structure and to said rib structures, with access for and working in part or wholly inside the assembly, and then finally placing and securing said spar structure to said rib structures and skin blankets to close the interior space, and working outside the assembly.

2. The method of assembling an airfoil structure which consists in prefabricating leading edge, rib, and top and bottom skin blanket sub-assemblies, and then, in succession, finally securing one of the skin blanket sub-assemblies to the leading edge sub-assembly, finally securing the rib sub-assembly to the leading edge sub-assembly and to the skin blanket sub-assembly, and then finally securing the other of the skin blanket sub-assemblies to the leading edge sub-assembly and to the rib sub-assembly, with access for and working in part or wholly inside the assembly.

3. The method of assembling an airfoil structure of closed construction comprising, as separate sub-assemblies, a leading edge section, a pair of top and bottom skin blankets, a single main spar having an opening therethrough with a side wall attaching portion extending in a plane transverse to the plane of the spar and aligned with the small dimension of the spar, and a rib having a projection adapted to extend into said opening for face-to-face engagement with the side wall attaching portion of the spar so that the spar can be secured by a shear connection to the rib which is accessible for connection from a location external of the construction, the steps of which consist of first positioning together the leading edge section, skin blankets, and the rib, and finally securing them together, with access for and working in part or wholly inside the assembly, then positioning the spar so that the rib projection is disposed in its opening and aligned with the side wall attaching portion, and finally securing the rib projection and the side wall attaching portion together, working from a location outside the fully enclosed assembly structure.

4. The method of assembling an airfoil structure of closed construction comprising, as separate sub-assemblies, a leading edge section, a pair of top and bottom skin blankets, a single main spar having an opening therethrough with a side wall attaching portion extending in a plane transverse to the plane of the spar and aligned with the small dimension of the spar, a rib having a projection adapted to extend into said opening for face-to-face engagement with the side wall attaching portion of the spar so that the spar can be secured by a shear connection to the rib, which connection is accessible from a location external of the construction, and a trailing edge frame having a projection adapted to fit within the opening into overlapping relation with the side wall attaching portion of the spar, the steps of which consist of first positioning together the leading edge section, skin blankets and rib and finally securing them together, with access for and working in part or wholly inside the assembly, positioning the spar so that the rib projection is disposed in its opening and aligned with the side wall attaching portion, positioning the trailing edge frame so that its projection is aligned with the opening of the spar and in overlapping relation with the side wall attaching portion and with the rib projection, and finally securing the spar and the trailing edge frame to the rib projection, working from a location outside the fully enclosed assembly structure.

5. The method of assembling an airfoil of the D-type section, which consists in prefabricating, as separate sub-assemblies, a leading edge provided with spanwise extending attaching portions, top and bottom skin blankets with similarly extending attaching portions adapted for attachment respectively with the leading edge attaching portions and with attaching clips for attachment to interdisposed ribs, ribs adapted for attachment between the skin blankets, and a spar adapted for attachment to the rear ends of the ribs, and then, in succession, finally securing together the spanwise extending attaching portions of the skin blankets and leading edge, working partly inside and partly outside the assembly, securing the ribs to the leading edge, working inside the assembly, securing the attaching clips of the skin blankets to the ribs through an overlapping engagement substantially in the plane of the ribs, working inside the assembly, and finally securing the spar to the ribs, working outside the assembly.

MICHAEL WATTER.

REFERENCES CITED

The following references are of record in the file of this patent:

UNITED STATES PATENTS

| Number | Name | Date |
| --- | --- | --- |
| 1,856,143 | Thaden | May 3, 1932 |
| 1,388,543 | Barling | Aug. 23, 1921 |
| 1,802,721 | Junkers | Apr. 28, 1931 |
| 2,019,272 | Ragsdale | Oct. 29, 1935 |
| 1,902,956 | Hughes | Mar. 28, 1933 |
| 1,781,723 | Fox | Nov. 18, 1930 |
| 1,784,501 | Staiger | Dec. 9, 1930 |
| 2,087,626 | Minshall | July 20, 1937 |
| 2,275,038 | Whitesell, Jr., et al. | Mar. 3, 1942 |